US012648050B2

(12) United States Patent
Atri et al.

(10) Patent No.: US 12,648,050 B2
(45) Date of Patent: Jun. 2, 2026

(54) ENHANCED CSFB

(71) Applicant: Parallel Wireless, Inc., Nashua, NH (US)

(72) Inventors: Rahul Atri, Pune (IN); Modi Daryani, Pune (IN); Yang Cao, Westford, MA (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 15/828,427

(22) Filed: Nov. 30, 2017

(65) Prior Publication Data

US 2018/0152865 A1 May 31, 2018

Related U.S. Application Data

(60) Provisional application No. 62/428,298, filed on Nov. 30, 2016.

(51) Int. Cl.
| | |
|---|---|
| *H04W 36/00* | (2009.01) |
| *H04W 36/30* | (2009.01) |
| *H04W 76/16* | (2018.01) |
| *H04W 76/30* | (2018.01) |

(52) U.S. Cl.
CPC ..... *H04W 76/30* (2018.02); *H04W 36/00224* (2023.05); *H04W 76/16* (2018.02); *H04W 36/0061* (2013.01); *H04W 36/302* (2023.05)

(58) Field of Classification Search
CPC . H04W 36/0022; H04W 76/30; H04W 76/16; H04W 36/30; H04W 36/0061
See application file for complete search history.

(56) References Cited

U.S. PATENT DOCUMENTS

| | | | | |
|---|---|---|---|---|
| 8,477,621 | B2 | 7/2013 | Janakiraman et al. | |
| 8,565,187 | B2 | 10/2013 | Lee | |
| 8,583,120 | B2 * | 11/2013 | Gong | H04W 48/16 |
| | | | | 455/435.1 |
| 8,644,831 | B2 * | 2/2014 | Bae | H04W 36/12 |
| | | | | 455/435.1 |
| 8,682,327 | B2 * | 3/2014 | Tenny | H04W 36/0061 |
| | | | | 455/435.1 |

(Continued)

OTHER PUBLICATIONS

International Search Report for PCT International application No. PCT/US17/64100, received Apr. 4, 2018.

(Continued)

*Primary Examiner* — Bailor C Hsu
(74) *Attorney, Agent, or Firm* — Michael Y. Saji; Ashish Patel

(57) ABSTRACT

Systems and methods for enhanced CSFB in a mobile operator core network are described. In one embodiment, a method of wireless communication by a user equipment (UE) is disclosed, comprising: directing a UE to move from an original cell using a first radio access technology (RAT) to a second cell using a second RAT to permit a circuit switched (CS) call; terminating the CS call at the second cell; determining whether the UE should reselect to the first RAT; identifying a target cell that may be in a same location as the second cell and that uses the first RAT; and sending the identified target cell to the UE within a field in a radio resource control message.

10 Claims, 7 Drawing Sheets

(56) References Cited

U.S. PATENT DOCUMENTS

| | | | | |
|---|---|---|---|---|
| 8,688,126 | B2* | 4/2014 | Wu | H04W 36/0022 |
| | | | | 455/437 |
| 8,879,416 | B2 | 11/2014 | Mishra et al. | |
| 8,977,303 | B2* | 3/2015 | Fang | H04W 36/00224 |
| | | | | 455/445 |
| 9,049,634 | B2 | 6/2015 | Hsu | |
| 9,113,352 | B2 | 8/2015 | Agarwal et al. | |
| 9,178,758 | B2* | 11/2015 | Chen | H04W 36/00224 |
| 9,332,460 | B2* | 5/2016 | Lee | H04W 36/00224 |
| 9,370,039 | B2* | 6/2016 | Uchiyama | H04W 76/30 |
| 9,456,399 | B2* | 9/2016 | Yang | H04W 36/24 |
| 9,491,801 | B2 | 11/2016 | Donepudi et al. | |
| 9,775,159 | B2* | 9/2017 | Kim | H04L 5/0035 |
| 10,098,044 | B2* | 10/2018 | Jeong | H04W 36/00224 |
| 2002/0193139 | A1 | 12/2002 | Mildh et al. | |
| 2004/0082328 | A1 | 4/2004 | Japenga et al. | |
| 2008/0222294 | A1 | 9/2008 | Liang | |
| 2010/0130205 | A1 | 5/2010 | Jung et al. | |
| 2010/0329210 | A1 | 12/2010 | Shirota et al. | |
| 2011/0176424 | A1* | 7/2011 | Yang | H04L 41/0803 |
| | | | | 370/236.2 |
| 2011/0205979 | A1* | 8/2011 | Silk | H04W 72/048 |
| | | | | 370/329 |
| 2012/0063414 | A1 | 3/2012 | Ramachandran | |
| 2012/0120789 | A1* | 5/2012 | Ramachandran | |
| | | | | H04W 36/0022 |
| | | | | 370/220 |
| 2012/0120922 | A1* | 5/2012 | Huang | H04W 36/32 |
| | | | | 370/332 |
| 2012/0135731 | A1* | 5/2012 | Rangaiah | H04W 48/20 |
| | | | | 455/434 |
| 2012/0300639 | A1 | 11/2012 | Janakiraman et al. | |
| 2013/0028081 | A1* | 1/2013 | Yang | H04W 48/20 |
| | | | | 370/230 |
| 2013/0034080 | A1 | 2/2013 | Yang et al. | |
| 2013/0231115 | A1* | 9/2013 | Lin | H04W 36/30 |
| | | | | 455/436 |
| 2013/0324076 | A1* | 12/2013 | Harrang | H04W 28/0284 |
| | | | | 455/405 |
| 2013/0329567 | A1 | 12/2013 | Mathias et al. | |
| 2014/0051443 | A1* | 2/2014 | Diachina | H04W 36/0022 |
| | | | | 455/436 |
| 2014/0064156 | A1 | 3/2014 | Paladugu et al. | |
| 2014/0080447 | A1 | 3/2014 | Janakiraman | |
| 2014/0092765 | A1 | 4/2014 | Agarwal et al. | |
| 2014/0206305 | A1 | 7/2014 | Wong et al. | |
| 2014/0335861 | A1* | 11/2014 | De Benedittis | H04W 36/0061 |
| | | | | 455/436 |
| 2015/0098391 | A1* | 4/2015 | Sridhar | H04W 36/0022 |
| | | | | 370/329 |
| 2015/0257051 | A1* | 9/2015 | Rao | H04W 24/02 |
| | | | | 455/439 |
| 2016/0014642 | A1* | 1/2016 | Liang | H04W 36/0022 |
| | | | | 370/331 |
| 2016/0044531 | A1 | 2/2016 | Papa et al. | |
| 2016/0044545 | A1* | 2/2016 | Yang | H04W 36/0022 |
| | | | | 370/331 |
| 2016/0057671 | A1 | 2/2016 | Yang et al. | |
| 2016/0100318 | A1* | 4/2016 | Wei | H04W 88/06 |
| | | | | 370/329 |
| 2016/0135132 | A1 | 5/2016 | Donepudi et al. | |
| 2016/0157142 | A1 | 6/2016 | Koskinen et al. | |
| 2016/0212755 | A1 | 7/2016 | Cao et al. | |
| 2016/0277991 | A1* | 9/2016 | Yang | H04W 36/322 |
| 2016/0277992 | A1 | 9/2016 | Cao | |
| 2016/0295489 | A1* | 10/2016 | Alonso-Rubio | H04L 43/16 |
| 2017/0013513 | A1 | 1/2017 | Agarwal et al. | |
| 2017/0013518 | A1* | 1/2017 | Kilgour | H04W 36/0066 |
| 2017/0273134 | A1 | 9/2017 | Cao et al. | |
| 2018/0054749 | A1* | 2/2018 | Kim | H04W 36/00837 |
| 2018/0279193 | A1* | 9/2018 | Park | H04W 36/30 |

OTHER PUBLICATIONS

European Telecommunications Standards Institute, ETSI TS 136 331 v12.10.0 (Aug. 2016), "LTE; Evolved Universal Terrestrial Radio Access (E-UTRA); Radio Resource Control (RRC); Protocol Specification (3GPP TS 36.331 version 12.10.0 Release 12)," Aug. 2016, V12.10.0.

"Circuit-Switched Fallback. The first phase of voice evolution for mobile LTE devices," Qualcomm, May 18, 2012, retrieved from https://www.ericsson.com/assets/local/news/2012/5/the_first_phase_of_voice_evolution_for_mobile_lte_devices.pdf.

Zahid Ghadialy, "Circuit Switched Fallback (CSFB): A Quick Primer," The 3G4G Blog, Feb. 23, 2011, retrieved from https://blog.3g4g.co.uk/2011/02/circuit-switched-fallback-csfb-quick.html.

3rd Generation Partnership Project, 3GPP TS 36.331 V11.16.0 (Jun. 2016), "3rd Generation Partnership Project; Technical Specification Group Radio Access Network; Evolved Universal Terrestrial Radio Access (E-UTRA); Radio Resource Control (RRC); Protocol Specification (Release 11)," Jun. 2016, V11.16.0.

* cited by examiner

401 After the CSFB call, evaluate whether condition is met based on measurements

402 Was UE handed over during call?

403 Assign new eNodeB colocated at target cell of handover

Yes

No

404 Assign colocated 4G enodeB

405 Send RRC connection release with E-UTRAN target info

406 UE redirected to EUTRAN via RRC connection release

ENHANCED CSFB

CROSS-REFERENCE TO RELATED APPLICATIONS

This application claims the benefit of priority under 35 U.S.C. § 119(e) or PCT Article 8 of U.S. Provisional Patent Application No. 62/428,298, filed on Nov. 30, 2016, which is hereby incorporated by reference herein in its entirety for all purposes. Additionally, this application hereby incorporates by reference U.S. Pat. No. 8,879,416, "Heterogeneous Mesh Network and a Multi-RAT Node Used Therein," filed May 8, 2013; U.S. Pat. No. 9,113,352, "Heterogeneous Self-Organizing Network for Access and Backhaul," filed Sep. 12, 2013; U.S. patent application Ser. No. 14/642,544, "Federated X2 Gateway," filed Mar. 9, 2015; U.S. patent application Ser. No. 14/822,839, "Congestion and Overload Reduction," filed Aug. 10, 2015; U.S. patent application Ser. No. 14/936,267, "Self-Calibrating and Self Adjusting Network," filed Nov. 9, 2015; U.S. patent application Ser. No. 15/002,383, "Multi-Rat Heterogeneous Carrier Aggregation," filed Jan. 20, 2016; U.S. patent application Ser. No. 15/076,644, "Content-Aware Inter-RAT RAB Steering," filed Mar. 21, 2016; U.S. patent application Ser. No. 15/207,494, "Enhanced X2 Protocol," filed Jul. 11, 2016, each in its entirety for all purposes. Additionally, U.S. Pat. No. 9,491,801 and U.S. Pat. App. Pub. Nos. US20170273134A1, US20140092765 and US20160135132 are also hereby incorporated by reference in their entirety for all purposes. Additionally, the following 3GPP technical specifications are hereby incorporated by reference: TS 36.331, dated as of the priority date of this application.

BACKGROUND

Circuit Switched FallBack (CSFB) is a technology whereby voice and SMS services are delivered to LTE devices through the use of UMTS or another circuit-switched network. CSFB is needed because LTE is a packet-based all-IP network that cannot support circuit-switched calls. When an LTE device is used to make or receive a voice call or SMS, the device "falls back" to the 3G or 2G network to complete the call or to deliver the SMS text message.

CSFB was specified in 3rd Generation Partnership Project (3GPP) Release 8. Although CSFB is often seen as an interim solution for LTE operators, with Voice over LTE (VoLTE) considered to be the long-term goal for the delivery of voice services on LTE networks, the inventors have recognized that 2G and 3G networks continue to have various advantages over VoLTE as currently deployed.

SUMMARY

Systems and methods for enhanced CSFB in a mobile operator core network are described.

In a first embodiment, a method of wireless communication by a user equipment (UE) is disclosed, comprising: directing a UE to move from an original cell using a first radio access technology (RAT) to a second cell using a second RAT to permit a circuit switched (CS) call; terminating the CS call at the second cell; determining whether the UE should reselect to the first RAT; identifying a target cell that may be in a same location as the second cell and that uses the first RAT; and sending the identified target cell to the UE within a field in a radio resource control message. The method may further comprise causing the UE to release a connection using the second RAT according to the radio resource control message; and causing the UE to reselect the target cell according to identification of the target cell as sent to the UE in the radio resource control message. The first RAT may be Universal Mobile Telecommunications System (UMTS), the second RAT may be Long Term Evolution (LTE), the first cell may be a nodeB, the second cell may be an eNodeB, the third cell may be a nodeB colocated with the second cell, and the radio resource control (RRC) message may be a RRC CONNECTION RELEASE message according to an LTE RRC protocol. The identifying may be performed at the second cell. The identifying may be performed based on load characteristics of the target cell.

The method may further comprise determining that the UE should remain on the second RAT, and causing the UE to maintain a connection using the second RAT by sending the second cell as the target cell in the radio resource control message. The method may further comprise identifying the target cell based on a comparison of a Global Positioning System (GPS) coordinate of the second cell and a GPS coordinate of the target cell, or based on a known coverage area of the second cell and a known coverage area of the target cell. The method may further comprise identifying the target cell based on a stored association of the second cell and the target cell at a coordinating server, the stored association providing an indication that the second cell and the target cell may be hosted on a single physical device.

The identifying may be performed at a coordinating gateway node that may be a gateway for the second cell to a core network of the second RAT and that may be a gateway for the third cell for the first RAT. The identifying may be performed at the coordinating gateway node based on load characteristics of the third cell that have been previously sent to the coordinating gateway node.

In a second embodiment, a coordinating server in a wireless network is disclosed, comprising: a processor; a radio access network interface in communication with the processor and in communication with a plurality of multi-radio access technology (multi-RAT) base stations; and a memory, the memory communicatively coupled with the processor, the memory The method may further comprise instructions that, when executed by the processor, cause the coordinating server to: direct a UE to move from an original cell using a first radio access technology (RAT) to a second cell using a second RAT to permit a circuit switched (CS) call; terminate the CS call at the second cell; identify a target cell that may be in a same location as the second cell and that uses the first RAT; and send, via the second cell, the identified target cell to the UE within a field in a radio resource control message.

The coordinating server may be a gateway between the plurality of multi-RAT base stations and a plurality of core networks for a plurality of RATs, and The plurality of RATs may include at least 3G and 4G.

In a third embodiment, a method for performing circuit switched fallback is disclosed, comprising: requesting, at a coordinating server, periodic performance measurements from a plurality of user equipments (UEs) attached to a source base station supporting a first radio access technology (RAT); identifying a target base station supporting a second RAT based on the received periodic performance measurements; receiving a service request for a circuit-switched call for a particular user equipment (UE); causing an inter-RAT handover of the UE to the identified target base station on the second RAT to be performed; and enabling connection of the circuit-switched call via a circuit-switched call functionality using the second RAT without forcing the UE to enter into a radio resource control idle mode.

The first RAT may be Long Term Evolution (LTE), the second RAT may be Universal Mobile Telecommunications System (UMTS), the inter-RAT handover may be a handover from LTE to UMTS, and the periodic performance measurements may be B1 measurements. The method may further comprise using an already-established radio resource control connection on the second RAT to connect the circuit-switched call. The method may further comprise identifying the target base station based on a comparison of Global Positioning System (GPS) coordinates for the source base station and GPS coordinates for the target base station. The method may further comprise identifying the target base station based on comparing, at the coordinating server, one or more of processor load, baseband load, radio resource load, radio resource control status, number of connected users of each base station, signal strength, and signal quality for each potential target base station. The service request may be received for a UE attached to a Long Term Evolution (LTE) RAT base station and The UE may be attached in an IDLE radio resource control mode.

DETAILED DESCRIPTION

Figure 1:
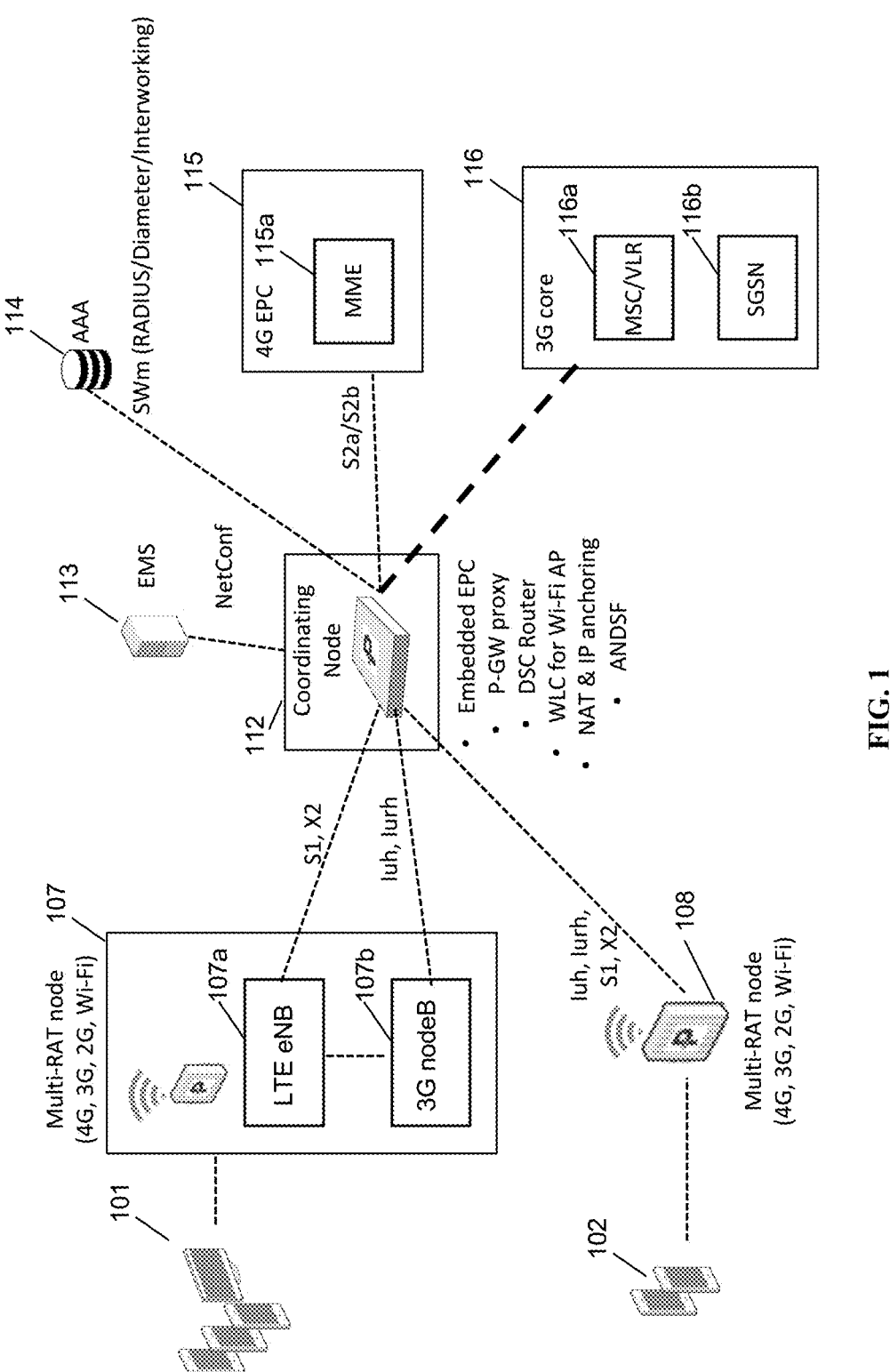
FIG. 1 is a schematic diagram of a multi-RAT node in communication with a plurality of core networks, in accordance with some embodiments.

The scope of this document is to provide various enhancements regarding circuit-switched fallback (CSFB) with shorter call setup time with HNG support and for fast return to LTE from 3G (after CSFB).

The Parallel Wireless HetNet Gateway™ (HNG)

In some embodiments, the advancements are provided with the help of a coordinating node. The Parallel Wireless HetNet Gateway™ (HNG) is a network node that can provide the coordinating node functionality described herein. In addition, the HNG sits between the radio access network (RAN) and the core network and coordinates base stations in the RAN, acting as a gateway and proxy and monitoring messages and signaling between the RAN and the core network, including UE signaling and data. This enables coordination of RAN nodes without burdening the core network, as well as flexibility regarding interconnection to one or more core networks and regarding changes to the RAN that are not specifically supported by the core network as standardized by the 3rd Generation Partnership Project (3GPP). The HNG is further described in the references identified herein.

Reselection to Co-Located Cells

In the prior art, when a circuit-switched (CS) call is released after successful CSFB, the UE is returned to LTE cell when UE is in IDLE mode i.e. mobile data is 'OFF.' But when the UE is in connected mode (when Mobile data is 'ON'), then the UE may not return to LTE. These are IDLE modes and the return of the UE to the LTE cell is an IDLE mode Reselection to LTE.

The inventors have understood and appreciated that, after CS call release, when the UE is in Cell_DCH or Cell_FACH or Cell_PCH, which are connected modes, the UTRAN may at any time initiate a RRC connection release by transmitting an RRC Connection Release message using UM RLC. This is a Connected mode relocation to LTE. Enhancements to the Connected mode relocation are further described herein, in accordance with some embodiments. CS call release may be considered a triggering criterion.

Prerequisites can include setting a minimum time that the UE must be in WCDMA system before redirection to LTE. The value should be selected to be neither too low nor too high or can be optimized by self-organizing network (SON) automatic functionality in the coordinating node by, e.g., relying on past data from the same or different nodes, pre-configuration, or by performing incremental adjustments to achieve a desirable state. In some embodiments, as an additional prerequisite, a database file can be maintained for whether the redirection to LTE is allowed for all UE or only for those that had been previously redirected from LTE. These prerequisites and the data used for them may be maintained either at the HNG or the base station.

An exemplary procedure follows. First, when a triggering condition is met, a HNG shall select the same base station (co-located or physically the same device) for LTE where CS call was ongoing on UMTS cell of same base station and inform target cell info to base station. The RRC entity may command UE redirection to LTE by sending RRC: RRC CONNECTION RELEASE message. Reselection, redirection, or handover may also be available options, in accordance with some embodiments.

In some embodiments, the RRC CONNECTION RELEASE message may contain an information entity (IE) "Redirection info" therein: IE "E-UTRA target info," which shall include an identifier of the designated target base station. The specifics regarding the IEs available in the RRC CONNECTION RELEASE message are found in 3GPP TS 36.331, version 12.10.0 of which is hereby incorporated by reference in its entirety; any existing IEs may be used, or in some embodiments new proprietary IEs may be used. In some embodiments, the identifier may be a E-UTRA Absolute Radio Frequency Channel Number (EARFCN); the identifier may also be an ARFCN, UARFCN, or another identifier as appropriate. In some embodiments, redirection is possible if E-UTRA Target Info contains at least one EARFCN (a variable number may be supported, for example up to 8). UE will try to camp on any frequency listed on E-UTRA Target Info excluding blacklisted cells. In case of handover, the new serving co-located base station 3G/4G) will be the new target for E-UTRAN. However, if no suitable cell on the indicated frequencies is found within a time interval, for example 10 s (or deployment specific), UE will attempt to camp on any suitable cell on any frequencies of that RAT (LTE). If no suitable cell is still found, UE camps on any cell on any RAT.

Benefits of the solution include an improved user experience in some embodiments after redirection from WCDMA to LTE in case of high load and lack of cell resources as this is more controlled. Additionally, in some embodiments, instead of waiting for resources in WCDMA, redirection to LTE improves user experience.

FIG. 1 is a schematic diagram of a multi-RAT node in communication with a plurality of core networks, in accordance with some embodiments. A plurality of UEs 101 are attached to multi-RAT node 107, which includes co-located LTE eNodeB 107a and 3G nodeB 107b. Multi-RAT node 107 may have antennas, radio filters, baseband processing circuitry, and/or processing circuitry for providing both 3G and 4G access. Access may be provided over different carrier frequencies, or the same carrier frequencies, as provided below. Another multi-RAT base station 108 is shown, with attached UEs 102. Base stations 107 and 108 are communicatively coupled to coordinating node 112.

Coordinating node 112 provides multiple services and functions, as described in U.S. Pat. No. 9,491,801 and U.S. Pat. App. Pub. No. US20170273134A1, hereby incorporated by reference in their entirety for al purposes. These functions may include: an embedded evolved packet core (EPC); a packet data network (P-GW) proxy; a DSC router; a wireless local area network controller (WLC); a network address translation (NAT) anchor and proxy; and an access network discovery and selection function (ANDSF). Element management system (EMS) 113 and authorization, authentication and accounting (AAA) server 114 are also shown coupled to coordinating node 112, and the coordinating node connects to these nodes to access core network services for one or more of the plurality of connected core networks.

Coordinating node 112 is also a gateway between the radio access network and one or more core networks. A 4G core network 115 is shown, including mobility management entity (MME) 115a, packet data network gateway (PGW) (not shown), and serving gateway (SGW) (not shown). A 3G core network 116 is also shown, including a mobile switching center/visitor location register (MSC/VLR) 116a, serving global packet radio system (GPRS) support node (SGSN) 116b, gateway GPRS support node (GGSN) (not shown), and other nodes. However, the LTE core network 115 is not capable on its own of supporting circuit-switched calls.

Various other combinations of RATs are contemplated. For example, any combination of two or three RATs of 2G/3G/4G/5G/Wi-Fi could be used in accordance with the present disclosure. Fallback from one RAT to another RAT is contemplated, including circuit-switched fallback and packet-switched fallback. In particular, CSFB from 4G to 2G is also contemplated by the present disclosure, as the LTE-based control messages remain the same, with fast return to LTE from 2G and evaluating whether to remain on 2G being new capabilities added by the present disclosure. An LTE eNodeB as described herein may be understood to mean a 5G gNodeB, where appropriate, and inter-RAT handover to and from 5G has been contemplated by the inventors according to the methods described herein.

In operation, a user equipment (UE) attached to multi-RAT node 107 may be attached to LTE eNB 107a. When a call is desired to be made or received, the UE must detach from LTE eNB 107a and must attach to a CS-capable node, such as 3G nodeB 107b or multi-RAT node 108 (in its 2G or 3G capacity). In the case that the UE is transitioned from an active state at the source base station to an active state at the target base station, the transition is called a handover; this is the case when the US is receiving or making a CS call, as shown below in FIG. 2.

Figure 2:
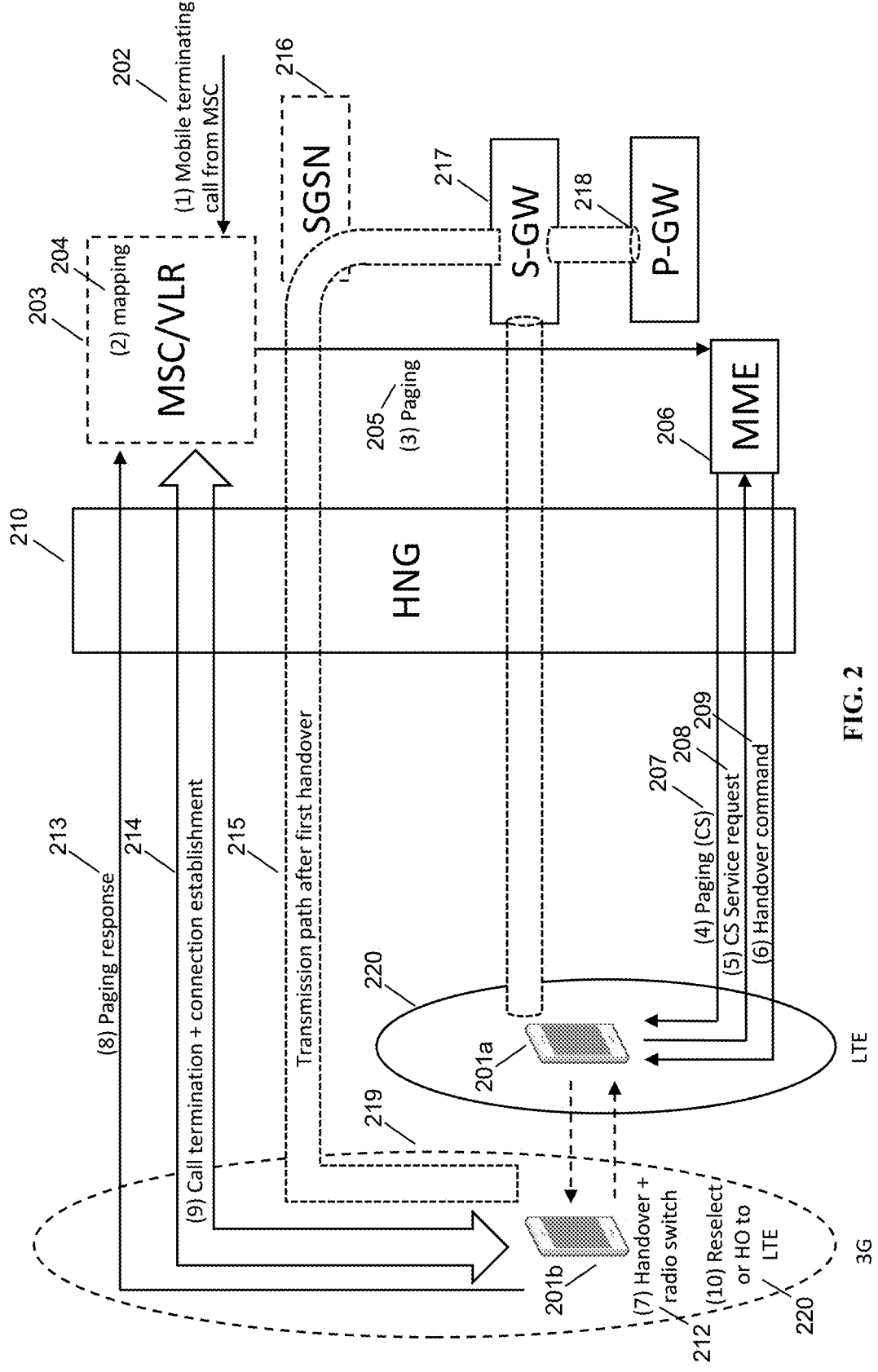
FIG. 2 is a schematic diagram of a circuit-switched fallback control flow, in accordance with some embodiments.

FIG. 2 is a schematic diagram of a circuit-switched fallback control flow, in accordance with some embodiments. UE 201a/201b are connected to MME 206, part of an LTE core network that also includes SGW 217 and PGW 218. A 3G core network is also shown, specifically, 3G mobile switching center/visitor location register (MSC/VLR) 203 and serving general packet radio support node (SGSN) 216. A gateway 210, shown as HNG (an abbreviation for the Parallel Wireless, Inc. HetNet Gateway™), acts as an intermediary between the eNodeBs/nodeBs/other RAN nodes (not shown in this diagram) and the core network nodes. A 3G domain 219 and a 4G/LTE domain 220 are shown for clarity.

At step 202, a mobile terminating call (MTC or MT call), e.g., a circuit-switched voice call from the viewpoint of the receiving UE, is received from a mobile switching center (MSC) somewhere in the network by MSC/VLR 203. The MSC/VLR consults an internal mapping 204 that enables the MSC to map the IMSI, phone number, or other user identifier received in step 202 to the MME that the target device is attached to. Once the MME is determined to be MME 206, MSC 203 sends a paging message 205 to the MME to wake up the UE. MME 206 sends a paging message 207 to the UE, which then responds with a CS service request 208. The MME responds with a handover command 209, since the 4G network is not enabled to provide CS service. At step 212, the UE is handed over to 3G domain 219 and performs a radio switch, and then at step 213, the UE sends a paging response back to MSC/VLR 203, enabling the MSC to complete the establishment of the call at step 214. The transmission path of data after the first handover is shown as tunnel 215 and passes through the 3G core network before reaching the 4G core network. Finally, at step 220, after the conclusion of the CS call, the UE is instructed to either reselect or handover back to LTE, as described below.

Figure 3:
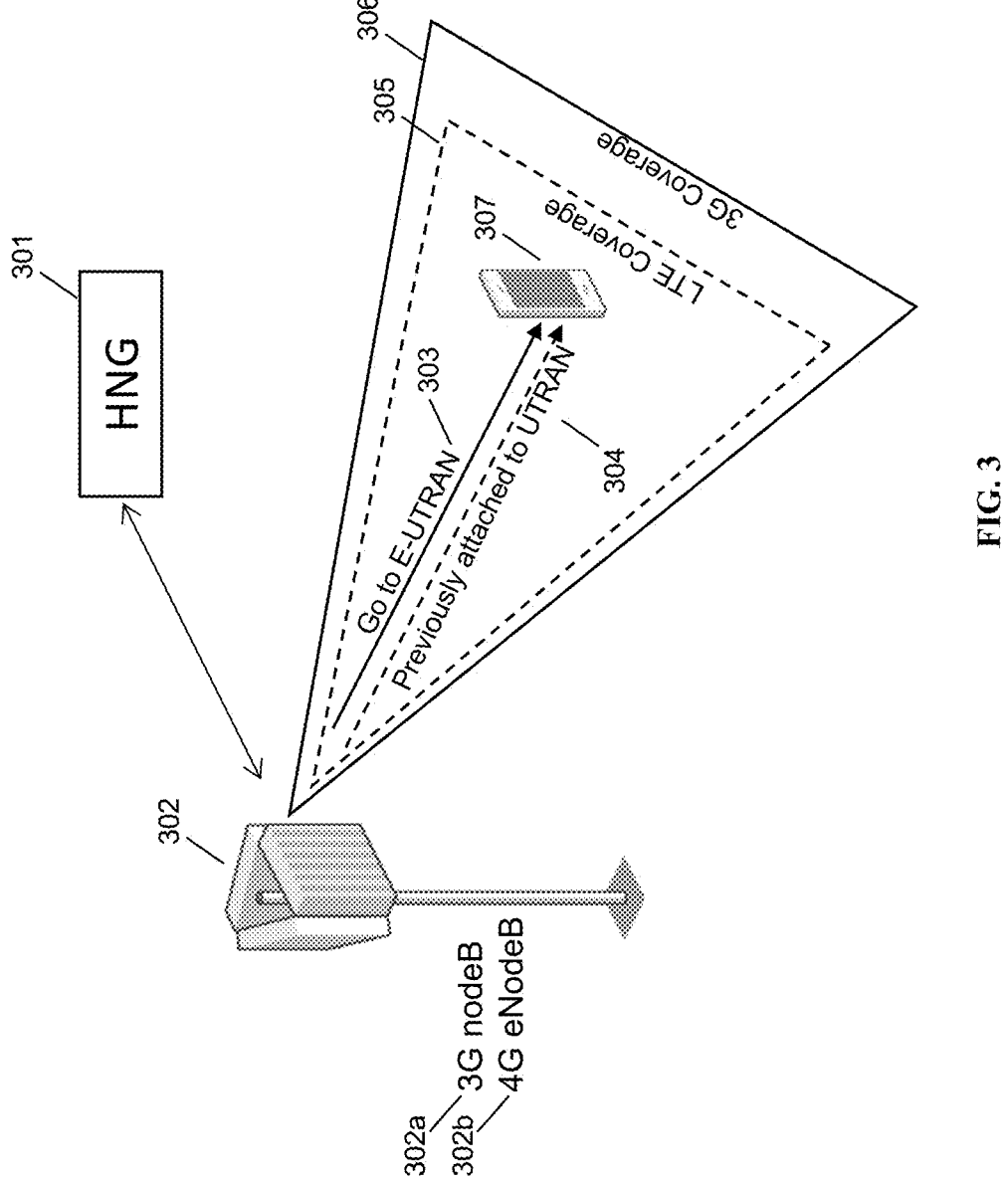
FIG. 3 is a schematic diagram of a plurality of coverage areas associated with a multi-RAT node, in accordance with some embodiments.

FIG. 3 is a schematic diagram of a plurality of coverage areas associated with a multi-RAT node, in accordance with some embodiments. Base station 302 includes both a 3G base station 302a and a 4G base station 302b and is a multi-RAT base station. Both 3G and 4G functionalities are in communication with each other as described with reference to FIG. 7, and are also in communication with gateway 301, which is shown as "HNG" to denote a Parallel Wireless HetNet Gateway™. HNG 301 may provide coordination functions. Base station 302 may also include a global positioning system (GPS) antenna and may report the GPS location to the HNG; the HNG may have a preexisting table or association showing the location of the multi-RAT base station. Area 305 is an LTE coverage area of the eNodeB located at base station 302; area 306 is a 3G coverage area of the nodeB located at base station 302. The areas are not shown to scale and do not show the particular extent of the coverage areas, other than to show that the location where UE 307 is located is in the coverage area of both LTE coverage area 305 and 3G coverage area 306.

In operation, UE 307 has concluded a CS call and is attached to the 3G nodeB 302a at base station 302. At this time, base station 302 may determine at least (1) whether UE 307 should be redirected to another base station, or should remain on the same nodeB, and (2) if UE 307 should be redirected, the base station to which UE 307 should be sent. In various embodiments of the present disclosure, base station 302 may determine these two steps on its own, in conjunction with HNG 301, or in reliance on HNG 301.

In one particular scenario, shown in FIG. 3, base station 302, in conjunction with HNG 301, determines that a return to LTE is appropriate. Assuming the UE has finished the call and is idle, and does not need to reactivate to obtain data via LTE, the return to the eNB would be called a cell reselection, as it is a transition from idle to idle. Cell redirection is a transition from connected mode to idle mode (e.g. in many cases for CS Fallback the UE is redirected from LTE RRC_CONNECTED mode to 2G/3G idle mode); cell handover is a transition from connected to connected (e.g. LTE RRC_CONNECTED to 3G RRC_CONNECTED/CELL_DCH). This determination may be based on: available baseband, processing, network, radio, or backhaul, etc. resources at 3G nodeB 302a, 4G eNodeB 302b, including numbers of users active on each nB/eNB; available resources of these various types in other parts of the network, including other mesh network nodes and including any wireless upstream backhaul connection utilization, as appropriate; load characteristics, including processor load, baseband load, radio resource load, radio resource control status, load on each relevant core network or core network node, such as load on the MME or load on the MSC/VLR for the 4G or 3G base stations, respectively, number of connected users of each base station, signal strength, and signal quality for each potential target base station; signal strength for 3G or 4G; signal strength or interference for other cells in the area; the priority of the user, the IMSI of the user or other UE identifier; or other factors as appropriate. This enables the network operator to appropriately adjust the number of users active on each RAT. Any and all such factors may be used for performing determinations of load, availability, and desirability of handover or reselection throughout this disclosure.

Once reselection to LTE is determined to be appropriate, base station 302, in conjunction with HNG 301, determines at step 304 that UE 307 was previously attached to the UTRAN (e.g., attached to 3G nodeB 302a) at base station 302, and also determines that there is another LTE eNodeB 302b coextensive in coverage with the 3G nodeB. This determination may be based on knowledge that nodeB 302a and eNodeB 302b are physically co-located on the same physical base station 302 or at the same physical installation, which in turn may be determined based on stored metadata or configuration information tied to identifiers of the base stations at HNG 301, or based on the base station 302 determining that it is handling the UE using two different RAT modules within the same base station, or based on the base station 302 being configured with GPS and the GPS locations being associated at HNG 301 with an identifier of the base station, or by another means. After making the determination in step 304 and finding the target base station, UE 307 is instructed to hand over to the target base station 302b via a radio resource control (RRC) message 303. The identifiers may be EARFCNs.

Figure 4:
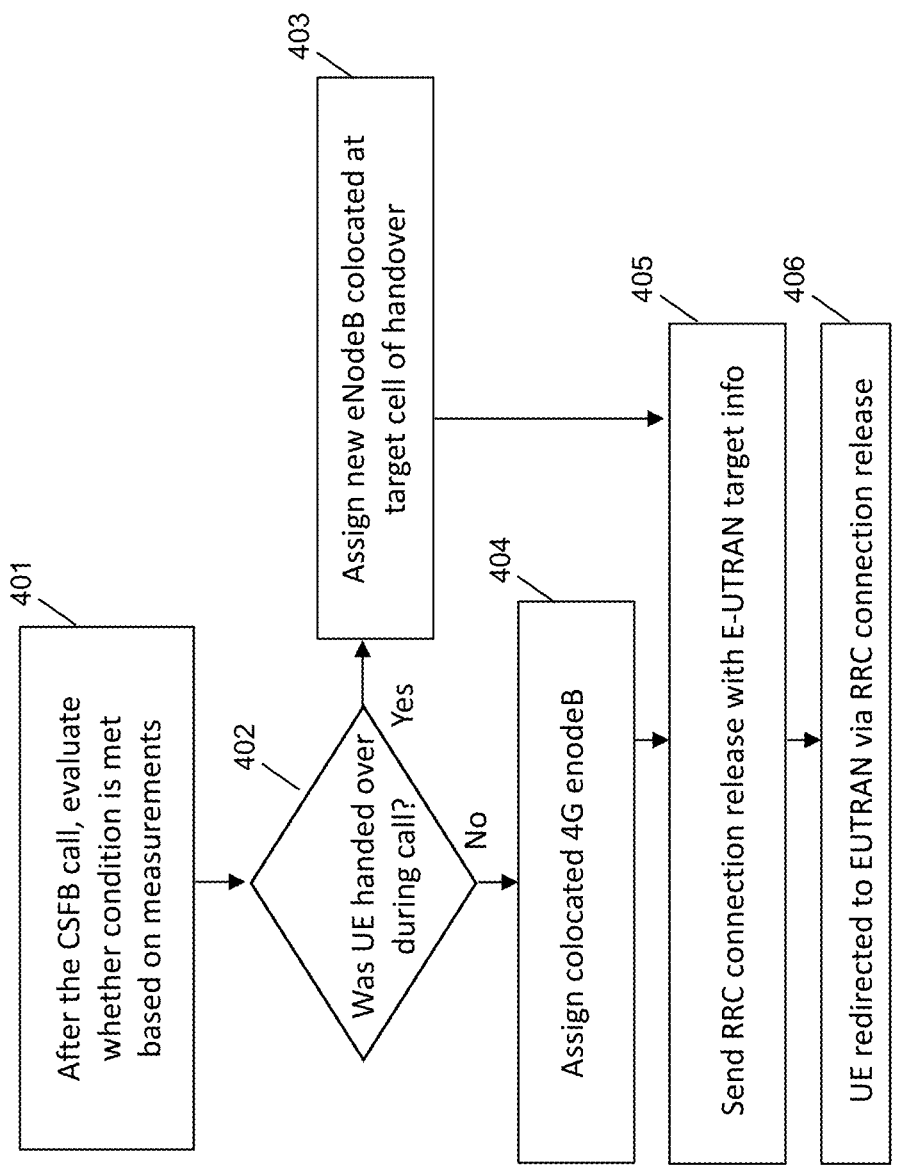
FIG. 4 is a flowchart showing selection of an eNodeB after CSFB, in accordance with some embodiments.

FIG. 4 is a flowchart showing selection of an eNodeB after CSFB, in accordance with some embodiments. Before step 401, a UE has been engaged to perform a CSFB call. At step 401, a determination is made after the UE's CSFB call has been terminated whether to remain on 3G or to return to 4G, based on various measurements as described above. At step 402, processing starts for determining the specific target eNodeB to designate for the UE. If the UE was handed over during the CSFB call, at step 403, the serving 3G nodeB determines if there is a new eNodeB co-located at the target cell of the handover, and if so, designates that eNodeB as the target. Otherwise, at step 404, when no handover has occurred the serving nodeB determines the identifier of the eNodeB that the serving nodeB itself is co-located with, and designates that eNodeB as the target. At step 405, a 3G RRC connection release message is sent to the UE with the designated target. At step 406, this results in the UE being redirected to the particular identified eNodeB.

In another set of embodiments, CSFB via Optimized PS handover is described, as follows.

CSFB to UTRAN Via Redirection (Handover)

Typically, in case of CS Fallback, a handover is not required or possibly is not supported by the network and/or the UE, and in such cases redirection becomes de facto the only possible mechanism to use. Furthermore, in some cases the redirection can be faster than handover due to many reasons (e.g. inter-RAT measurement delay/cell detection, L3 filtering, time-to-trigger, handover preparation in the network etc.), especially in cases where mobile-originated/mobile-terminated calls (which requires the UE to move to RRC_CONNECTED state and perform CSFB) are triggered from LTE idle mode. The inventors have determined that a handover may be advantageous in certain situations as follows.

In some embodiments, a handover is contemplated instead of reselection. With CSFB to UTRAN via redirection, as known in the prior art, call setup time is high because: 1) UE need to make a RRC connection at the blindly selected/re-directed UTRAN cell; and 2) if the target cell is not available or failure due to any unknown cause (Radio not available, Transport not available etc.), call setup time is even higher. Another method currently used is CSFB via PS handover with B1 measurement, involving measurements that are performed prior to the handover, but in this case UE needs to create measurement gaps in between transmissions to measure the inter-frequency neighbors. In this prior art method, 1) the UE has to compromise on scheduling and report measurements during measurement gaps; 2) the process sometimes results in the UE being dropped before CSFB is completed; and 3) the entire process still consumes a significant amount of time. Thus to deal with this current situation, we would like to suggest an improved version of CSFB via PS handover but without B1 measurements, thereby enhancing the whole process.

In some embodiments, with the help of the HNG the UEs served by LTE cell would be configured to send periodic B1 measurements (UE measurement reports). The last reported B1 measurement report by the UE would be considered for PS (CSFB) Handover. Based on the received periodic measurements, HNG would identify the neighbor for the PS HO. The base station need not wait for the measurement report from UE. Instead, whenever a UE requests CSFB, the UE can perform PS Handover to the UTRAN cell. After completion of PS handover, an RRC connection already exists for a CS call, reducing the overall latency of a CS call. To ensure that the UE is not handed over to an over shooter cell (meaning, a cell that is grossly larger than other cells while having a lower signal-to-noise ratio (SNR)), the target cell can be checked with help of GPS coordinates configured while commissioning cell. Alternatively, or in combination, the PS handover can be limited to first tier neighbors only, i.e., cells that are directly adjacent to the serving cell. This could be determined by HNG. Using this method, the UE is not forced to enter into a radio resource control idle mode.

Figure 5:
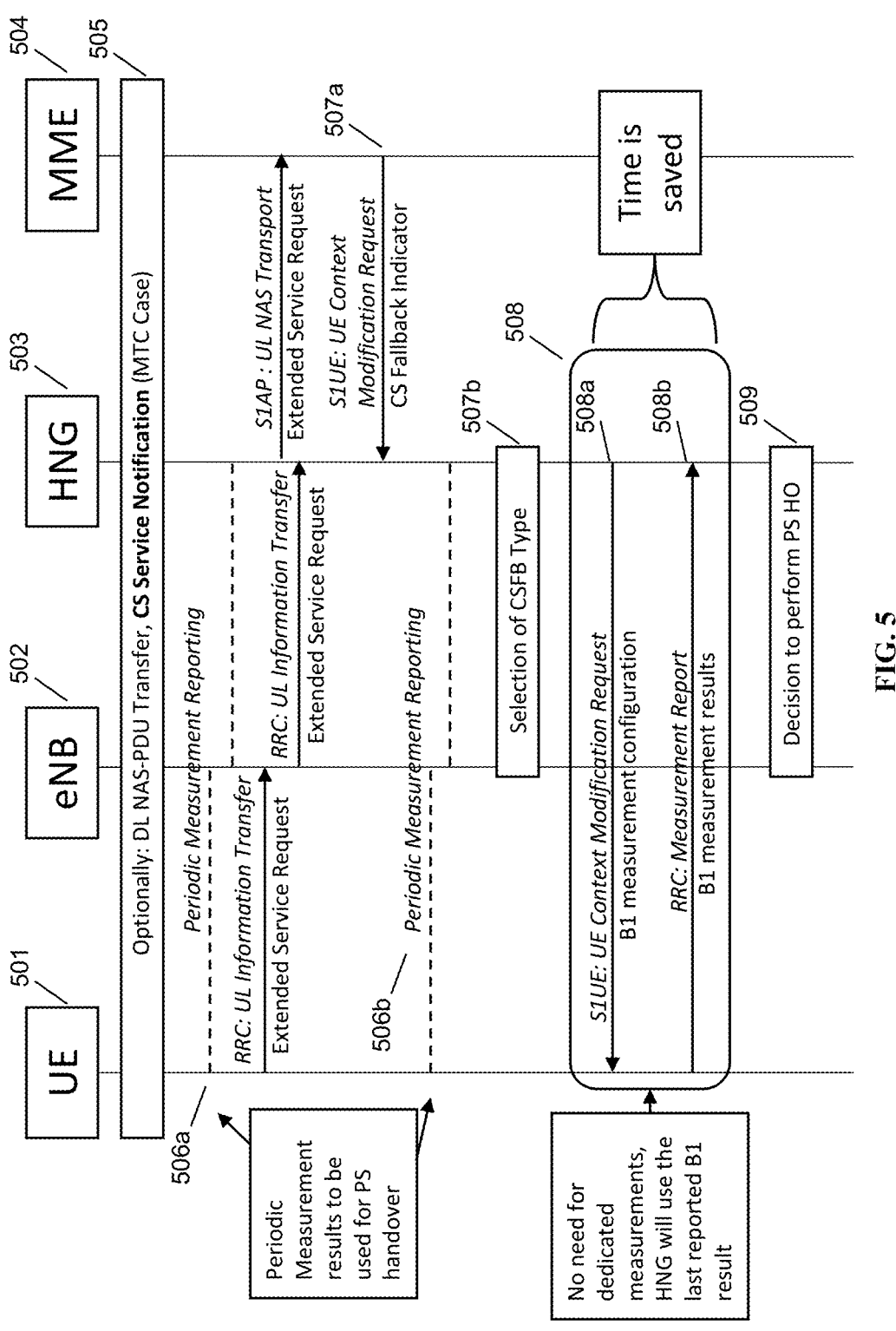
FIG. 5 is a signaling diagram showing periodic measurements prior to CSFB or inter-RAT handover, in accordance with some embodiments.

FIG. 5 is a signaling diagram showing periodic measurements prior to CSFB or inter-RAT handover, in accordance with some embodiments. UE 501, base station/eNodeB 502, HNG 503, and MME 504 are shown. For simplicity, the 3G nodeB that is the target of the handover is not shown. At preliminary step 505, optionally, a downlink network access stratum (NAS) packet data unit (PDU) transfer may be performed to transfer data, and a CS service notification may be made in the case of a mobile-terminated call.

At steps 506a and 506b, the UE is directed to periodically provide measurement reporting. This measurement reporting includes information about signal strength of neighboring cells, as described in the LTE standard. These measurement reports are received by HNG 503 and saved for future use. Measurement reports may be received from many or all UEs that are in the network; this enables the HNG to continuously monitor the state of the network, including the state of all neighbors of eNodeB 502. The period may be configured; the period may also be turned on and off based on messages and commands from the network or from the HNG. The reports may be solicited from a plurality of UEs across the whole network, reducing the power impact on any one single UE.

Figure 6:
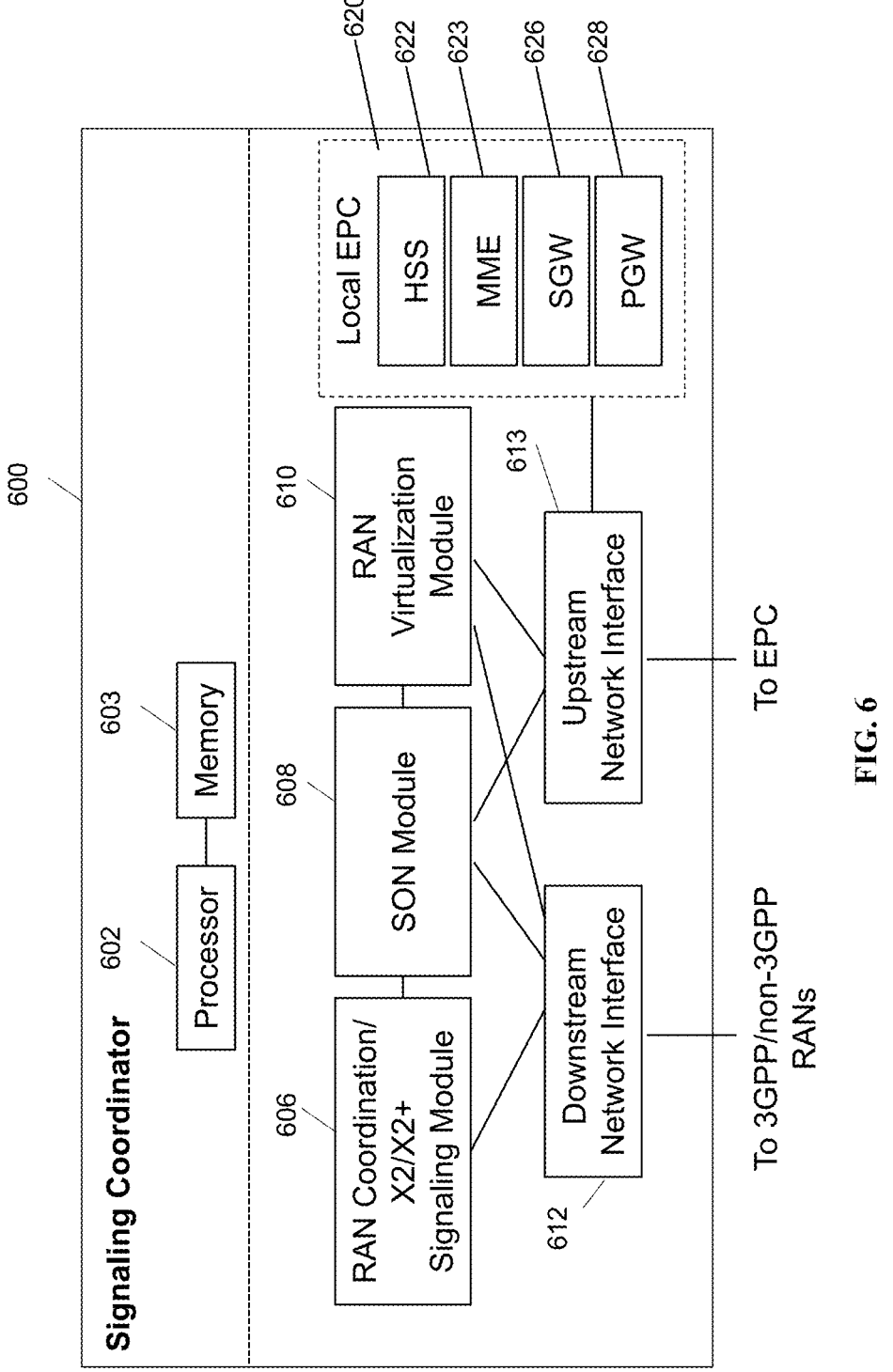
FIG. 6 is a schematic diagram of an enhanced coordination gateway, in accordance with some embodiments.

At step 507a, a request is received from the MME to perform CSFB. This request is intercepted by HNG 503 and selection of a CSFB type is performed at step 507b. Typically, if eNodeB 502 were to hand over to a 3G nodeB, the MME (or in this case the intervening HNG gateway 503) would have to request a B1 measurement 508a and wait for the return of that measurement 508b; however, as the measurements have been collected previously, there is no need for dedicated measurements and the HNG can use the last reported B1 result, saving the time required for steps 508. Once it is determined that a CSFB can be advantageously avoided by performing PS handover instead, handover is initiated by the eNodeB 502, as shown at step 511. Hardware and Software FIG. 6 is a schematic diagram of an enhanced coordination gateway, in accordance with some embodiments. Signaling coordinator 600 is intended to correspond to coordinating node 112, HNG 210, HNG 301, and HNG 503, in various embodiments. Signaling coordinator 600 includes processor 602 and memory 604, which are configured to provide the functions described herein. Also present are radio access network coordination/signaling (RAN Coordination and signaling)/X2/X2+ module 606, SON module 608, and RAN virtualization module 610. In some embodiments, coordinator server 600 may coordinate multiple RANs using SON module 608, including 3GPP and non-3GPP RANs. In some embodiments, coordination server may also provide proxying, routing virtualization and RAN virtualization via module 610. In some embodiments, a downstream network interface 612 is provided for interfacing with the RANs, which may be a radio interface (e.g., LTE), and an upstream network interface 614 is provided for interfacing with the core network, which may be either a radio interface (e.g., LTE) or a wired interface (e.g., Ethernet). CSFB functions, including identification of target base stations or determination of appropriateness of returning to LTE or remaining on 3G, etc., may be performed in module 606.

Signaling coordinator 600 includes local evolved packet core (EPC) module 620, for authenticating users, storing and caching priority profile information, and performing other EPC-dependent functions when no backhaul link is available. Local EPC 620 may include local HSS 622, local MME 624, local SGW 626, and local PGW 628, as well as other modules. Local EPC 620 may incorporate these modules as software modules, processes, or containers. Local EPC 620 may alternatively incorporate these modules as a small number of monolithic software processes. Modules 606, 608, 610 and local EPC 620 may each run on processor 602 or on another processor, or may be located within another device.

Signaling coordinator 600 may be a pass-through gateway for data tunnels, forwarding data through to a core network. Signaling coordinator 600 may also provide encryption functions, e.g., using IPsec for encrypting or decrypting data for forwarding over one or more bearers to the core network. In the case that Wi-Fi is used at one or more base stations to provide access to user devices, the signaling coordinator may be a trusted wireless access gateway (TWAG) or evolved packet data gateway (ePDG), providing the ability for the Wi-Fi user devices to participate in and join the operator network. In some cases, signaling coordinator 600 may be a home eNodeB gateway (HENBGW). Because the built-in QCI and TOS mechanisms used by the methods described herein are passed through by IPsec, GTP-U, and other tunneling protocols, these quality of service (QOS) parameters are preserved by the signaling coordinator 600.

Figure 7:
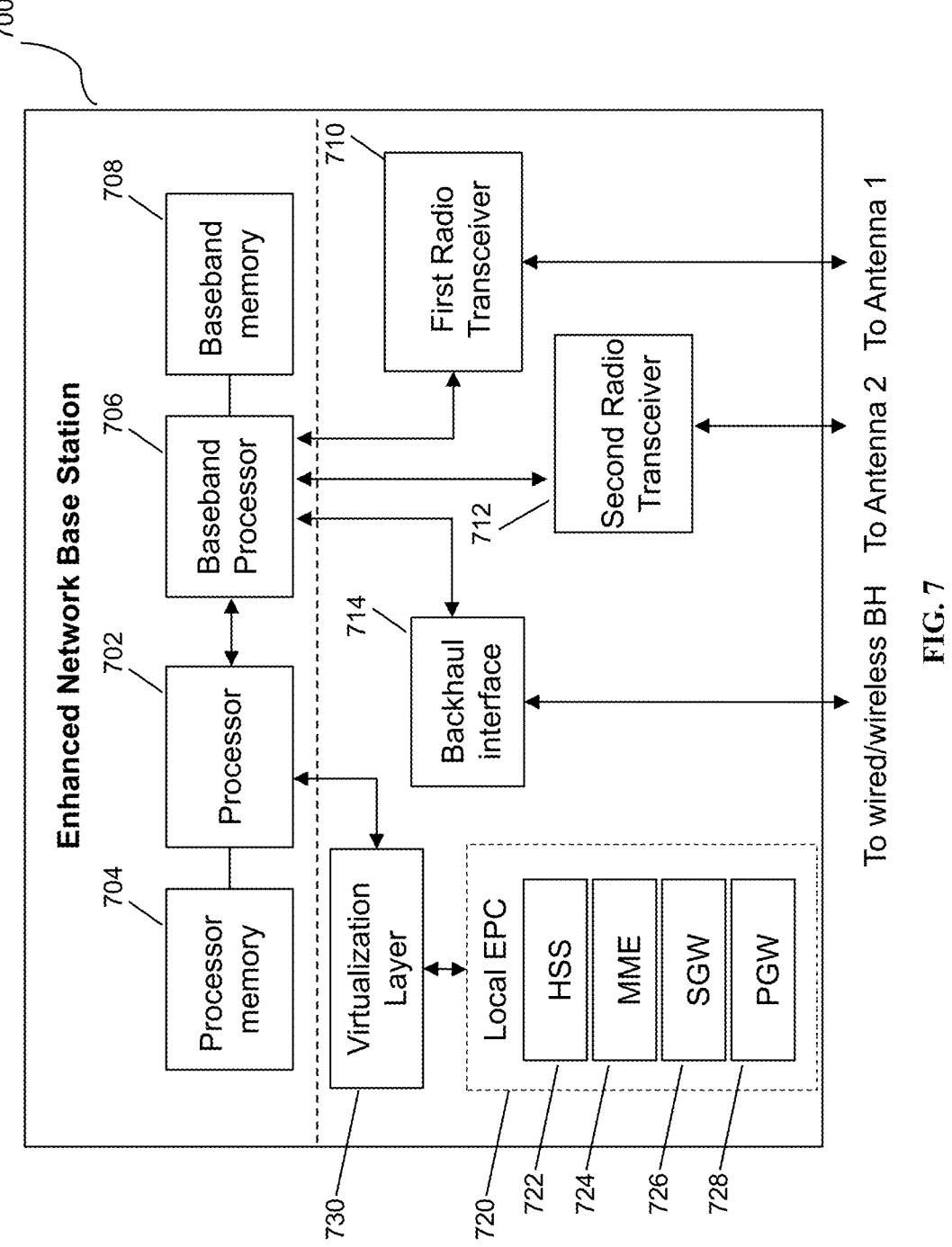
FIG. 7 is a schematic diagram of an enhanced network base station, in accordance with some embodiments.

FIG. 7 is a schematic diagram of an enhanced network base station, in accordance with some embodiments. Enhanced network base station 700 may include processor 702, processor memory 704 in communication with the processor, baseband processor 706, and baseband processor memory 708 in communication with the baseband processor. Base station 700 may also include first radio transceiver 710 and second radio transceiver 712, and backhaul interface 714. A GPS antenna may also be included (not shown).

A virtualization layer 730 may also be included for mediating communications with an evolved packet core EPC, specifically including the core network EPC (not shown) and local evolved packet core (EPC) module 720. Local EPC 720 may be used for authenticating users and performing other EPC-dependent functions when no backhaul link is available. Local EPC 720 may include local HSS 722, local MME 724, local SGW 726, and local PGW 728, as well as other modules. Local EPC 720 may incorporate these modules as software modules, processes, or containers. Local EPC 720 may alternatively incorporate these modules as a small number of monolithic software processes. Virtualization layer 730 and local EPC 720 may each run on processor 702 or on another processor, or may be located within another device.

Processor 702 and baseband processor 706 are in communication with one another. Processor 702 may perform routing functions, and may determine if/when a switch in network configuration is needed. Baseband processor 706 may generate and receive radio signals for both radio transceivers 710 and 712, based on instructions from processor 702. In some embodiments, processors 702 and 706 may be on the same physical logic board. In other embodiments, they may be on separate logic boards.

In some embodiments, a 3G and a 4G base station may be provided by base station 700, with the 3G and 4G base station functionality both performed on processor 702. The base station functionalities may be performed by separate modules, or separate processes; alternately, they may be performed in a monolithic process, in multiple threads, on different processors, or otherwise divided up. The 3G and 4G base station functionalities may exchange data using lightweight inter-process communication, shared memory, messages exchanged on the local host, or exchanged via a network interface, which could be a local wired bridging interface or a wireless, Wi-Gig, or fronthaul interface.

The first radio transceiver 710 may be a radio transceiver capable of providing LTE eNodeB functionality, and may be capable of higher power and multi-channel OFDMA. The second radio transceiver 712 may be a radio transceiver capable of providing 3GPP WCDMA or UMTS functionality or GSM/2G functionality. Both transceivers 710 and 712 are capable of receiving and transmitting on one or more bands. The transceivers may be switched. Transceiver 710 may be coupled to processor 702 via a Peripheral Component Interconnect-Express (PCI-E) bus, and/or via a daughtercard.

Wired backhaul or wireless backhaul may be used, via backhaul interface 714, which is connected to the wired/ wireless backhaul antenna or physical interface. Wired backhaul may be an Ethernet-based backhaul (including Gigabit Ethernet), or a fiber-optic backhaul connection, or a cable-based backhaul connection, in some embodiments. Wireless backhaul may be provided by embedding an LTE UE module (not shown) within backhaul interface 714; this LTE UE module may attach to a macro base station and provide a connection through an LTE network, which is then used to provide a route to base station 700's own core network. Additionally, wireless backhaul may be Wi-Fi 802.11a/b/g/ n/ac/ad/ah, Wi-Gig, Bluetooth, ZigBee, microwave (including line-of-sight microwave), or another wireless backhaul connection. Any of the wired and wireless connections may be used for either access or backhaul, according to identified network conditions and needs, and may be under the control of processor 702 for reconfiguration. In some embodiments, the backhaul link may be a mesh link, and the enhanced base station may be coupled with other base stations in a mesh network to provide access using a shared upstream backhaul link.

Other elements and/or modules may also be included, such as a home eNodeB, a local gateway (LGW), a self-organizing network (SON) module, or another module. Additional radio amplifiers, radio transceivers and/or wired network connections may also be included.

Processor 702 may identify the appropriate network configuration, and may perform routing of packets from one network interface to another accordingly. Processor 702 may use memory 704, in particular to store a routing table to be used for routing packets. Baseband processor 706 may perform operations to generate the radio frequency signals for transmission or retransmission by both transceivers 710 and 712. Baseband processor 706 may also perform operations to decode signals received by transceivers 710 and 712. Baseband processor 706 may use memory 708 to perform these tasks. Either baseband processor 706 or processor 702, or a combination thereof, may provide processing to enable base station 700 to provide eNB, nodeB, or other access functionality.

Alternatives

Various alternative embodiments are also contemplated by the inventors. For example, certain functions may be performed at a multi-radio access technology node (multi-RAT) node, instead of at a base station management gateway, or vice versa. The base station management gateway may substantially take the form of the described Parallel Wireless HetNet Gateway. The base station management gateway may be a virtualization server. The functions of the base station management gateway may be broken up and spread across multiple network nodes, or multiple software or hardware modules within the same network node, and may be physically located in a single location, or multiple locations. The network node may be in the data path located between the radio access network (RAN) and the core network, in some embodiments, or may be located at another location in the network. A high-bandwidth wired connection may be used for backhaul, such as coaxial cable, fiber optic cable, or Ethernet, or a reduced-bandwidth wireless connection, such as microwave, line-of-sight, or other physical connections may be used as backhaul.

In some embodiments, the disclosure may also be used with a 4G network that supports VoLTE. In the case that VoLTE is supported by a 4G network, it may be desirable to (a) either avoid the use of VoLTE for load or other reasons; or to (b) hand the UE over to another RAT in order to either avoid loading the 4G network, to reserve 4G resources for future use, or other reasons. In this case, after a VoLTE call, the UE may then be directed to perform an inter-RAT handover as described elsewhere herein.

In some embodiments, a SON module at the coordinating node may integrate information from both 3GPP and Wi-Fi base stations, based on the X2+ protocol described herein, which information may include: load on various networks or RANs; historical drops; thresholds for handovers; absolute numbers of call drops; handover statistics; interference and received signal strength of networks, including UE measurement reports; power outages at one or more RANs; configurations and software version numbers.

In some embodiments, the data necessary to perform analysis of cells, SNR, load, signaling, UE measurement reports, etc. is stored at the signaling coordinator 600, along with the logic for interpreting and utilizing the data. In other embodiments, the data may be maintained at the base stations themselves, along with the logic. In other embodiments, the data may be maintained at one or more gateway nodes, together with the logic; this may occur in the case of the use of mesh backhaul, in which case there may be multiple gateway nodes on the way through the mesh. In other embodiments, the data and logic are stored at more than one of the above; in the case where multiple nodes are involved, in some embodiments the HNG/coordinating gateway may handle final decision-making, or may expressly delegate decision-making; in other embodiments, the nodes at the edge of the network (i.e. RAN nodes) may operate substantially independently.

In some embodiments, the visibility of a coordinating node is in the form of a virtualized RAN or virtualized eNodeB. One or more core networks may see a coordinating node as a single eNodeB. The coordinating node is responsible for performing management on a plurality of eNodeBs and Wi-Fi APs, without additional management from a core network, using the SON features and algorithms described herein, which may include all SON methods described in U.S. Pat. App. Pub. Nos. US20140092765 and US20160135132, each hereby incorporated by reference in their entirety for all purposes. Coordinating nodes may communicate with each other via the X2+ protocol as peers, and may enable the features described herein across multiple coordinating nodes, for example, handovers or SON coordination across operator network management areas managed by different coordinating nodes.

In some embodiments, a coordinating node that is not a gateway may be used, as some embodiments merely require consultation with the eNodeB/nodeB to provide information. In such embodiments, the eNodeB or nodeB may be modified from the standard to exchange information as appropriate with the coordinating node.

Where modules are described herein, the intent of this disclosure is to enable the module's functionality to be provided as hardware, software, or partially hardware and partially software, in some embodiments. In the case that a software module is used to implement the functionality of a module, the module may be a single executable, multiple executables, shared libraries, dynamically linked libraries, statically linked libraries, multiple processes with shared memory, multiple processes with inter-process communication (IPC), software running on a single virtual machine or multiple virtual machines, processes communicating with each other over a private or public network over real or virtual network interfaces but co-located at a single machine, or according to any other software design.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, legacy TDD, or other air interfaces used for mobile telephony. In some embodiments, the base stations described herein may support Wi-Fi air interfaces, which may include one or more of IEEE 802.11a/b/g/n/ac/ad/af/ah/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces. In some embodiments, the base stations described herein may use programmable frequency filters. In some embodiments, the Wi-Fi frequency bands described herein may be channels determined by the respective IEEE 802.11 protocols, which are incorporated herein to the maximum extent permitted by law. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported. The embodiments disclosed herein can be used with a variety of protocols so long as there are contiguous frequency bands/channels. Although the method described assumes a single-in, single-output (SISO) system, the techniques described can also be extended to multiple-in, multiple-out (MIMO) systems. In some embodiments, WCDMA and UMTS are used interchangeably to mean any 3GPP-compliant 3G network stack.

Those skilled in the art will recognize that multiple hardware and software configurations may be used depending upon the access protocol, backhaul protocol, duplexing scheme, or operating frequency band by adding or replacing daughtercards to the dynamic multi-RAT node. Presently, there are radio cards that can be used for the varying radio parameters. Accordingly, the multi-RAT nodes of the present invention may be designed to contain as many radio cards as desired given the radio parameters of heterogeneous mesh networks within which the multi-RAT node is likely to operate. Those of skill in the art will recognize that, to the extent an off-the shelf radio card is not available to accomplish transmission/reception in a particular radio parameter, a radio card capable of performing, e.g., in white space frequencies, would not be difficult to design.

Those of skill in the art will also recognize that hardware may embody software, software may be stored in hardware as firmware, and various modules and/or functions may be performed or provided either as hardware or software depending on the specific needs of a particular embodiment. Those of skill in the art will recognize that small cells, macro cells, wireless access points, femto gateways, etc. may all benefit from the methods described herein.

In any of the scenarios described herein, where processing may be performed at the cell, the processing may also be performed in coordination with a cloud coordination server. The eNodeB may be in communication with the cloud coordination server via an X2/X2+ protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

In any scenario described herein where the word "co-located" is used, the term may also be understood to encompass, e.g., determining that two cells have the same physical location using stored GPS coordinates, and determining that two cells have the same or similar or substantially overlapping coverage areas. These determinations may be made using fuzzy matching, maps, or other techniques.

In some embodiments, RRC connection release redirection is contemplated for redirecting a UE from one cell to another cell, including inter-RAT, without CSFB, e.g., at the end of a 2G/3G/4G/5G PS or CS session, based on any or all of the above determinations and parameters described above. For example, a UE that has finished with a data session (perhaps watching a streaming video) over LTE may be redirected to 3G, if appropriate and if helpful for the 4G cell, e.g., by reducing load at the 4G cell or by reducing utilization of radio resources that are desired to be used for other purposes. The HNG may be involved in such determinations as well.

While the present disclosure uses the term "small cell," this term is used merely to illustrate the concepts herein, and nothing is implied regarding size, power level etc. for any cells that could be used with the disclosed systems and methods, i.e. "small cell" may be interpreted as including macro cells, femto cells, multi-radio access technology (RAT) access nodes, indoor cells, outdoor cells, etc.

Although the methods above are described as separate embodiments, one of skill in the art would understand that it would be possible and desirable to combine several of the above methods into a single embodiment, or to combine disparate methods into a single embodiment. For example, all of the above methods may be combined. In the scenarios where multiple embodiments are described, the methods may be combined in sequential order, in various orders as necessary.

Although certain of the above systems and methods are described in reference to the Long Term Evolution (LTE) standard, one of skill in the art would understand that these systems and methods may be adapted for use with other wireless standards or versions thereof.

While the term "server" and "gateway" are used herein, it is understood that the coordinating node, HNG, server, gateway, etc. may be a general computing device connected to a network, and any particular configuration of the general computing device as a gateway, etc. may be relevant only as required by a particular embodiment.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as a computer memory storage device, a hard disk, a flash drive, an optical disc, or the like. The present invention may be embodied in other specific forms without departing from the spirit or essential characteristics thereof. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be combined and/or used in another embodiment. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative of, but not limiting of, the scope of the invention, which is specified in the following claims.

The invention claimed is:

1. A method of wireless communication, comprising:
configuring a user equipment (UE) to send periodic measurement reports;
based on a last measurement report of the periodic measurement reports, directing the UE to move from an original cell using a first radio access technology (RAT) to a second cell using a second RAT to permit a circuit switched (CS) call;
terminating the CS call at the second cell;
identifying a target cell based on a stored association of the second cell and the target cell at a coordinating server, the stored association providing an indication that the second cell and the target cell are hosted on a single physical device;
sending the identified target cell to the UE within a field in a radio resource control message,
causing the UE to release a connection using the second RAT according to the radio resource control message; and
causing the UE to transition to the target cell according to identification of the target cell as sent to the UE in the radio resource control message,
wherein the first RAT is Long Term Evolution (LTE) or 5G, and wherein the second RAT is 2G or 3G.

2. The method of claim 1, wherein the radio resource control (RRC) message is a RRC CONNECTION RELEASE message according to an LTE RRC protocol.

3. The method of claim 1, wherein the identifying is performed at the coordinating server or the second cell.

4. The method of claim 1, wherein the identifying is performed based on load characteristics of the target cell.

5. The method of claim 1, further comprising determining that the UE should remain on the second RAT, and causing the UE to maintain a connection using the second RAT by sending the second cell as the target cell in the radio resource control message.

6. The method of claim 1, wherein the identifying is performed at a coordinating gateway node that is a gateway for the second cell to a core network of the second RAT and that is a gateway for the target cell for the first RAT.

7. The method of claim 1, wherein the load characteristics include at least one of processor load, baseband load and radio resource load.

8. A coordinating server in a wireless network, comprising:
a processor;
a radio access network interface in communication with the processor and in communication with a plurality of multi-radio access technology (multi-RAT) base stations; and
a memory, the memory communicatively coupled with the processor, the memory further comprising instructions that, when executed by the processor, cause the coordinating server to:
configure a user equipment (UE) to send periodic measurement reports;
based on a last measurement report of the periodic measurement reports direct the UE to move from an original cell using a first radio access technology (RAT) to a second cell using a second RAT to permit a circuit switched (CS) call;
terminate the CS call at the second cell;
identify a target cell based on a stored association of the second cell and the target cell at a coordinating server, the stored association providing an indication that the second cell and the target cell are hosted on a single physical device;
send, via the second cell, the identified target cell to the UE within a field in a radio resource control message;
direct the UE to release a connection using the second RAT according to the radio resource control message; and
cause the UE to transition to the target cell according to identification of the target cell as sent to the UE in the radio resource control message,
wherein the first RAT is Long Term Evolution (LTE) or 5G, and wherein the second RAT is 2G or 3G.

9. The coordinating server of claim 8, wherein the coordinating server is a gateway between the plurality of multi-RAT base stations and a plurality of core networks for a plurality of RATs, and wherein the plurality of RATs includes at least 3G and 4G.

10. The coordinating server of claim 8, wherein the load characteristics include at least one of processor load, baseband load and radio resource load.

* * * * *